US006253185B1

(12) United States Patent
Arean et al.

(10) Patent No.: US 6,253,185 B1
(45) Date of Patent: Jun. 26, 2001

(54) MULTIPLE DESCRIPTION TRANSFORM CODING OF AUDIO USING OPTIMAL TRANSFORMS OF ARBITRARY DIMENSION

(75) Inventors: Ramon Arean, Lausanne (CH); Vivek K. Goyal, Hoboken, NJ (US); Jelena Kovacevic, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/190,908

(22) Filed: Nov. 12, 1998

Related U.S. Application Data

(63) Continuation-in-part of application No. 09/030,488, filed on Feb. 25, 1998.

(51) Int. Cl.[7] .................................................. G01L 19/00
(52) U.S. Cl. ........................................... 704/500; 704/201
(58) Field of Search .................................... 704/201, 229, 704/500, 503; 341/51, 87

(56) References Cited

U.S. PATENT DOCUMENTS 5,768,535 * 6/1998 Chadda et al. .................. 395/200.77
5,928,331 * 7/1999 Bushmitch ........................... 709/231
5,974,380 * 10/1999 Smyth et al. ........................ 704/229

FOREIGN PATENT DOCUMENTS

0123456-A2 * 1/2000 (EP) .................................... 100/100

OTHER PUBLICATIONS

V.K. Goyal et al., "Multiple Description Transform Coding: Robustness to Erasures Using Tight Frame Expansions," In Proc. IEEE Int. Symp. Inform. Theory, Aug. 1998.

V.K. Goyal and J Kovacevic, "Optimal Multiple Description Transform Coding of Gaussian Vectors," In Proc. IEEE Data Compression Conf., pp. 388–397, Mar. 1998.

* cited by examiner

*Primary Examiner*—Richemond Dorvil
*Assistant Examiner*—Susan Wieland
(74) *Attorney, Agent, or Firm*—Ryan, Mason & Lewis, LLP

(57) ABSTRACT

A multiple description (MD) joint source-channel (JSC) encoder in accordance with the invention encodes n components of an audio signal for transmission over m channels of a communication medium, where n and m may take on any desired values. In an illustrative embodiment, the encoder combines a multiple description transform coder with elements of a perceptual audio coder (PAC). The encoder is configured to select one or more transform parameters for a multiple description transform, based on a characteristic of the audio signal to be encoded. For example, the transform parameters may be selected such that the resulting transformed coefficients have a variance distribution of a type expected by a subsequent entropy coding operation. The components of the audio signal may be quantized coefficients separated into a number of factor bands, and the transform parameter for a given factor band may be set to a value determined based on a transform parameter from at least one other factor band, e.g., the previous factor band. As another example, the transform parameter for one or more of the factor bands may be selected based on a determination as to whether the audio signal to be encoded is of a particular predetermined type. A desired variance distribution may also be obtained for the transformed coefficients by, e.g., pairing or otherwise grouping coefficients such that the coefficients of each pair or group are required to be in the same factor band.

30 Claims, 9 Drawing Sheets

MULTIPLE DESCRIPTION TRANSFORM CODING OF AUDIO USING OPTIMAL TRANSFORMS OF ARBITRARY DIMENSION

RELATED APPLICATION

The present application is a continuation-in-part of U.S. patent application Ser. No. 09/030,488 filed Feb. 25, 1998 in the names of inventors Vivek K. Goyal and Jelena Kovacevic and entitled "Multiple Description Transform Coding Using Optimal Transforms of Arbitrary Dimension."

FIELD OF THE INVENTION

The present invention relates generally to multiple description transform coding (MDTC) of signals for transmission over a network or other type of communication medium, and more particularly to MDTC of audio signals.

BACKGROUND OF THE INVENTION

Multiple description transform coding (MDTC) is a type of joint source-channel coding (JSC) designed for transmission channels which are subject to failure or "erasure." The objective of MDTC is to ensure that a decoder which receives an arbitrary subset of the channels can produce a useful reconstruction of the original signal. One type of MDTC introduces correlation between transmitted coefficients in a known, controlled manner so that lost coefficients can be statistically estimated from received coefficients. This correlation is used at the decoder at the coefficient level, as opposed to the bit level, so it is fundamentally different than techniques that use information about the transmitted data to produce likelihood information for the channel decoder. The latter is a common element in other types of JSC coding systems, as shown, for example, in P. G. Sherwood and K. Zeger, "Error Protection of Wavelet Coded Images Using Residual Source Redundancy," Proc. of the $31^{st}$ Asilomar Conference on Signals, Systems and Computers, November 1997. Other types of MDTC may be based on techniques such as frame expansions, as described in V. K. Goyal et al., "Multiple Description Transform Coding: Robustness to Erasures Using Tight Frame Expansions," In Proc. IEEE Int. Symp. Inform. Theory, August 1998.

A known MDTC technique for coding pairs of independent Gaussian random variables is described in M. T. Orchard et al., "Redundancy Rate-Distortion Analysis of Multiple Description Coding Using Pairwise Correlating Transforms," Proc. IEEE Int. Conf. Image Proc., Santa Barbara, CA, October 1997. This MDTC technique provides optimal 2×2 transforms for coding pairs of signals for transmission over two channels. However, this technique as well as other conventional techniques fail to provide optimal generalized n×m transforms for coding any n signal components for transmission over any m channels. In addition, conventional transforms such as those in the M. T. Orchard et al. reference fail to provide a sufficient number of degrees of freedom, and are therefore unduly limited in terms of design flexibility. Moreover, the optimality of the 2×2 transforms in the M. T. Orchard et al. reference requires that the channel failures be independent and have equal probabilities. The conventional techniques thus generally do not provide optimal transforms for applications in which, for example, channel failures either are dependent or have unequal probabilities, or both. These and other drawbacks of conventional MDTC prevent its effective implementation in many important applications.

SUMMARY OF THE INVENTION

The invention provides MDTC techniques which can be used to implement optimal or near-optimal n×m transforms for coding any number n of signal components for transmission over any number m of channels. A multiple description (MD) joint source-channel (JSC) encoder in accordance with an illustrative embodiment of the invention encodes n components of an audio signal for transmission over m channels of a communication medium, in applications in which, e.g., at least one of n and m may be greater than two, and in which the failure probabilities of the m channels may be non-independent and non-equivalent. The encoder in the illustrative embodiment combines a multiple description transform coder with elements of a perceptual audio coder (PAC).

In accordance with one aspect of the invention, the MD JSC encoder is configured to select one or more transform parameters for a multiple description transform, based on a characteristic of the audio signal to be encoded. For example, the transform parameters may be selected such that the resulting transformed coefficients have a variance distribution of a type expected by a subsequent entropy coding operation. The components of the audio signal may be quantized coefficients separated into a number of factor bands, and the transform parameter for a given factor band may be set to a value determined based on a transform parameter from at least one other factor band, e.g., the previous factor band. As another example, the transform parameter for one or more of the factor bands may be selected based on a determination as to whether the audio signal to be encoded is of a particular predetermined type. A desired variance distribution may also be obtained for the transformed coefficients by, e.g., pairing or otherwise grouping coefficients such that the coefficients of each pair or group are required to be in the same factor band.

In accordance with another aspect of the invention, in an embodiment in which the audio signal components are quantized coefficients separated into a number of factor bands, the quantized coefficients for at least one of the factor bands may be rescaled to equalize for the effect of quantization on the multiple description transform parameters. For example, the quantized coefficients for a given one of the factor bands may be rescaled using a factor which is a function of the quantization step size used in that factor band. One such factor, which has been determined to provide performance improvements in a MD PAC JSC, is $1/\Delta^2$, where $\Delta$ is the quantization step size used in the given factor band. Other factors could also be used.

An MD JSC encoder in accordance with the invention may include a series combination of N "macro" MD encoders followed by an entropy coder, and each of the N macro MD encoders includes a parallel arrangement of M "micro" MD encoders. Each of the M micro MD encoders implements one of: (i) a quantizer block followed by a transform block, (ii) a transform block followed by a quantizer block, (iii) a quantizer block with no transform block, and (iv) an identity function. In addition, a given n×m transform implemented by the MD JSC encoder may be in the form of a cascade structure of several transforms each having dimension less than n×m. This general MD JSC encoder structure allows the encoder to implement any desired n×m transform while also minimizing design complexity.

The MDTC techniques of the invention do not require independent or equivalent channel failure probabilities. As a result, the invention allows MDTC to be implemented effectively in a much wider range of applications than has heretofore been possible using conventional techniques. The MDTC techniques of the invention are suitable for use in conjunction with signal transmission over many different types of channels, including, for example, lossy packet networks such as the Internet, wireless networks, and broadband ATM networks.

DETAILED DESCRIPTION OF THE INVENTION

The invention will be illustrated below in conjunction with exemplary MDTC systems. The techniques described may be applied to transmission of a wide variety of different types of signals, including data signals, speech signals, audio signals, image signals, and video signals, in either compressed or uncompressed formats. The term "channel" as used herein refers generally to any type of communication medium for conveying a portion of an encoded signal, and is intended to include a packet or a group of packets. The term "packet" is intended to include any portion of an encoded signal suitable for transmission as a unit over a network or other type of communication medium. The term "linear transform" should be understood to include a discrete cosine transform (DCT) as well as any other type of linear transform. The term "vector" as used herein is intended to include any grouping of coefficients or other elements representative of at least a portion of a signal. The term "factor band" as used herein refers to any range of coefficients or other elements bounded in terms of, e.g., frequency, coefficient index or other characteristics.

Figure 1:
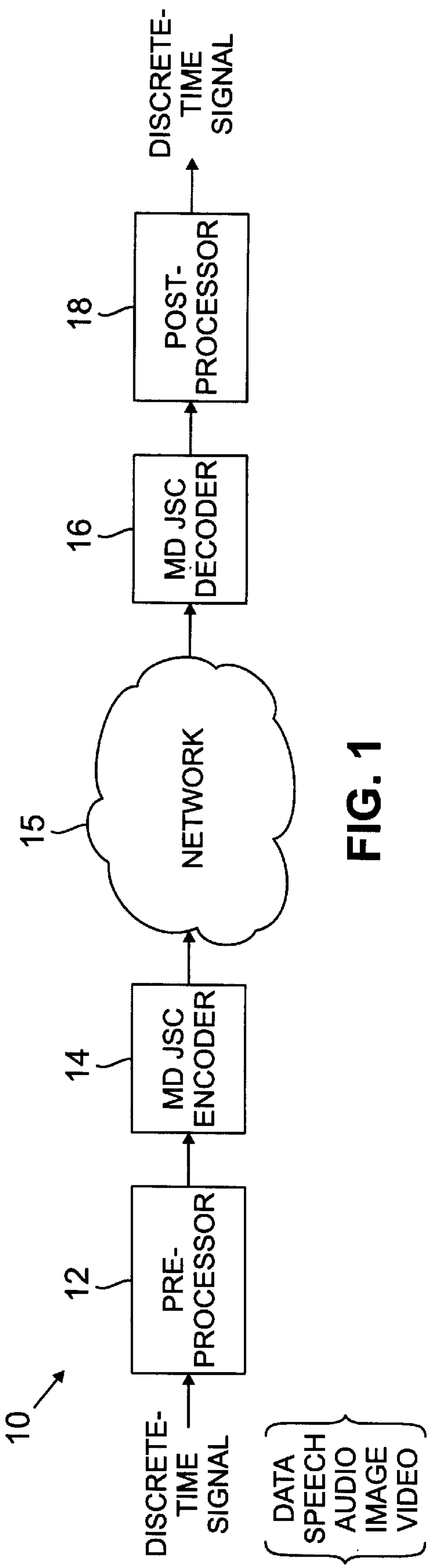
FIG. 1 shows an exemplary communication system in accordance with the invention.

FIG. 1 shows a communication system 10 configured in accordance with an illustrative embodiment of the invention. A discrete-time signal is applied to a pre-processor 12. The discrete-time signal may represent, for example, a data signal, a speech signal, an audio signal, an image signal or a video signal, as well as various combinations of these and other types of signals. The operations performed by the pre-processor 12 will generally vary depending upon the application. The output of the preprocessor is a source sequence $\{x_k\}$ which is applied to a multiple description (MD) joint source-channel (JSC) encoder 14. The encoder 14 encodes n different components of the source sequence $\{x_k\}$ for transmission over m channels, using transform, quantization and entropy coding operations. Each of the m channels may represent, for example, a packet or a group of packets. The m channels are passed through a network 15 or other suitable communication medium to an MD JSC decoder 16. The decoder 16 reconstructs the original source sequence $\{x_k\}$ from the received channels. The MD coding implemented in encoder 14 operates to ensure optimal reconstruction of the source sequence in the event that one or more of the m channels are lost in transmission through the network 15. The output of the MD JSC decoder 16 is further processed in a post processor 18 in order to generate a reconstructed version of the original discrete-time signal.

Figure 2:
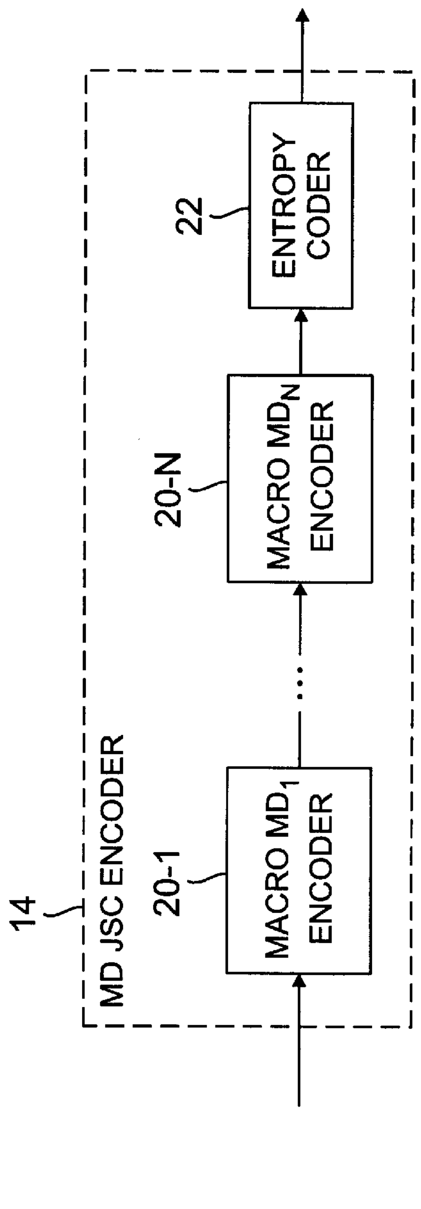
FIG. 2 shows a multiple description (MD) joint source-channel (JSC) encoder in accordance with the invention.
Figure 3:
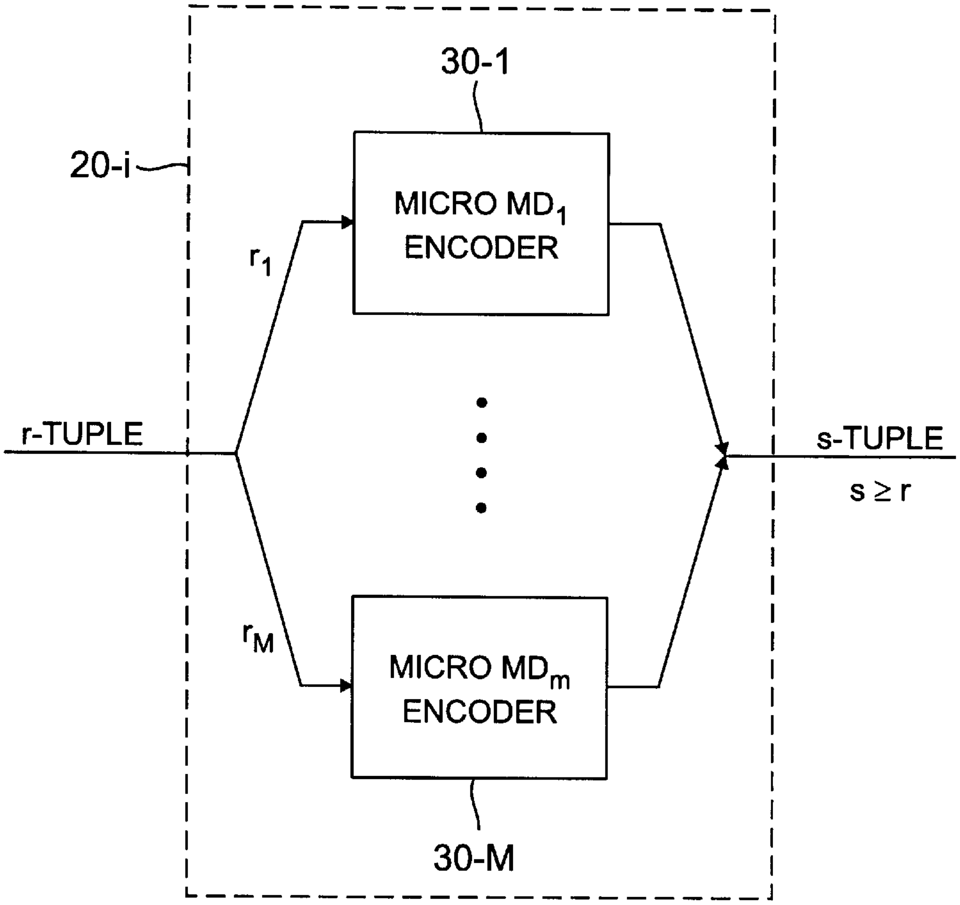
FIG. 3 shows an exemplary macro MD encoder for use in the MD JSC encoder of FIG. 2.

FIG. 2 illustrates the MD JSC encoder 14 in greater detail. The encoder 14 includes a series arrangement of N macro $MD_i$ encoders $MD_1, \ldots MD_N$ corresponding to reference designators 20-1, . . . 20-N. An output of the final macro $MD_i$ encoder 20-N is applied to an entropy coder 22. FIG. 3 shows the structure of each of the macro $MD_i$ encoders 20-*i*. Each of the macro MDi encoders 20-*i* receives as an input an r-tuple, where r is an integer. Each of the elements of the r-tuple is applied to one of M micro $MD_j$ encoders $MD_1, \ldots MD_N$ corresponding to reference designators 30-1, . . . 30-M. The output of each of the macro $MD_i$ encoders 20-*i* is an s-tuple, where s is an integer greater than or equal to r.

Figure 4:
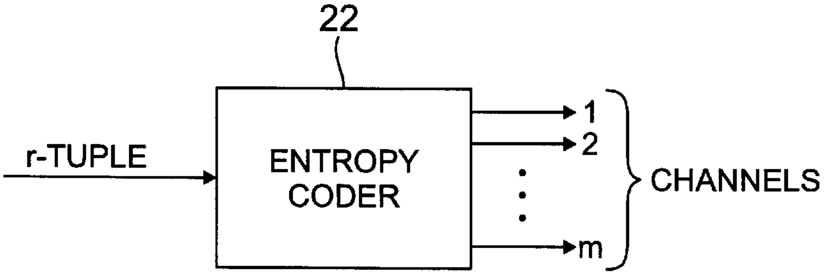
FIG. 4 shows an entropy encoder for use in the MD JSC encoder of FIG. 2.

FIG. 4 indicates that the entropy coder 22 of FIG. 2 receives an r-tuple as an input, and generates as outputs the m channels for transmission over the network 15. In accordance with the invention, the m channels may have any distribution of dependent or independent failure probabilities. More specifically, given that a channel i is in a state $S_i \epsilon\{0, 1\}$, where $S_i=0$ indicates that the channel has failed while $S_i=1$ indicates that the channel is working, the overall state S of the system is given by the cartesian product of the channel states $S_i$ over m, and the individual channel probabilities may be configured so as to provide any probability distribution function which can be defined on the overall state S.

Figure 5A:
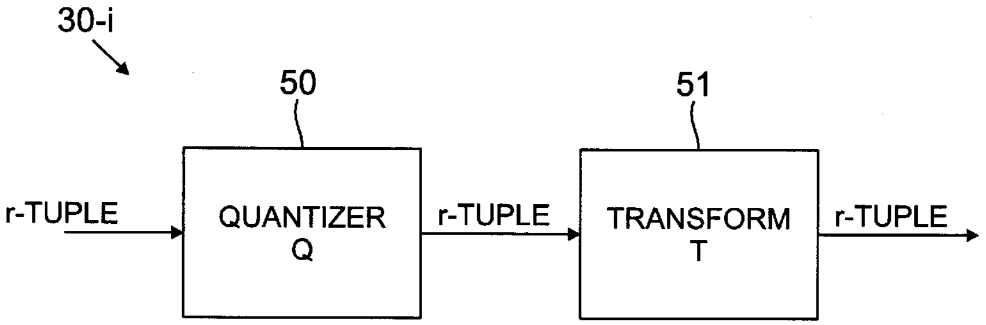
FIGS. 5A through 5D show exemplary micro MD encoders for use in the macro MD encoder of FIG. 3.
Figure 5B:
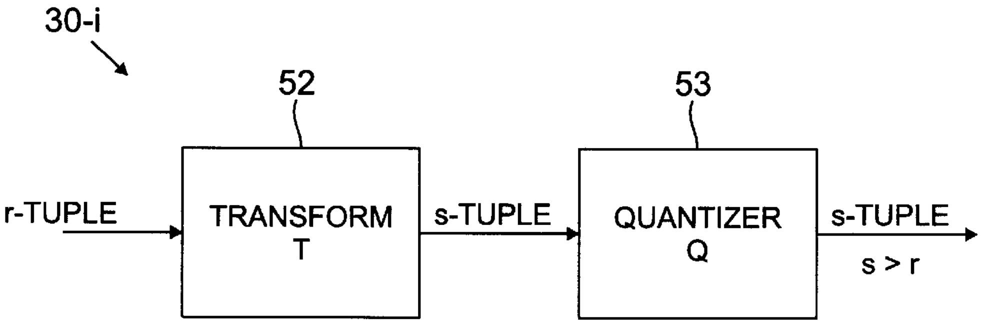
Figure 5C:
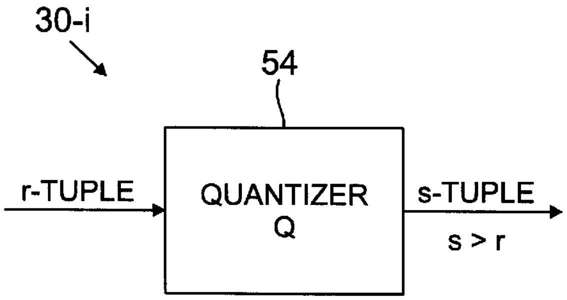
Figure 5D:
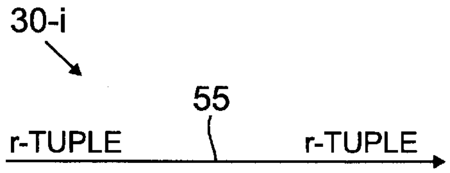

FIGS. 5A through 5D illustrate a number of possible embodiments for each of the micro $MD_j$ encoders 30-*j*. FIG. 5A shows an embodiment in which a micro MDj encoder 30-*j* includes a quantizer (Q) block 50 followed by a transform (I) block 51. The Q block 50 receives an r-tuple as input and generates a corresponding quantized r-tuple as an output. The T block 51 receives the r-tuple from the Q block 50, and generates a transformed r-tuple as an output. FIG. 5B shows an embodiment in which a micro $MD_j$ encoder 30-*j* includes a T block 52 followed by a Q block 53. The T block 52 receives an r-tuple as input and generates a corresponding transformed s-tuple as an output. The Q block 53 receives the s-tuple from the T block 52, and generates a quantized s-tuple as an output, where s is greater than or equal to r. FIG. 5C shows an embodiment in which a micro $MD_j$ encoder 30-*j* includes only a Q block 54. The Q block 54 receives an r-tuple as input and generates a quantized s-tuple as an output, where s is greater than or equal to r. FIG. 5D shows another possible embodiment, in which a micro $MD_j$ encoder 30-*j* does not include a Q block or a T block but instead implements an identity function, simply passing an r-tuple at its input through to its output. The micro $MD_j$ encoders 30-*j* of FIG. 3 may each include a different one of the structures shown in FIGS. 5A through 5D.

Figure 6A:
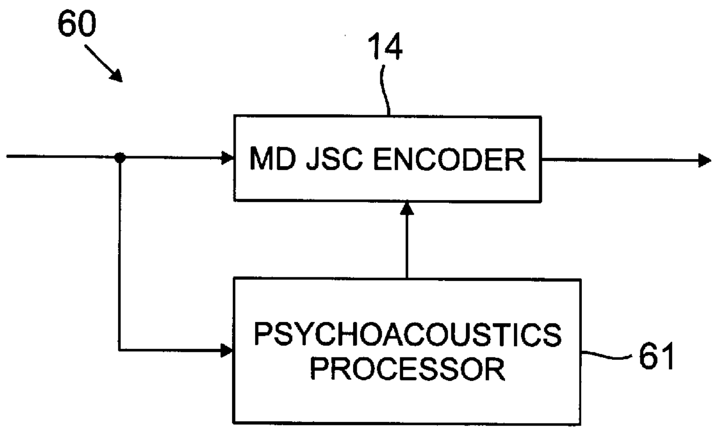
FIGS. 6A, 6B and 6C show respective audio encoder, image encoder and video encoder embodiments of the invention, each including the MD JSC encoder of FIG. 2.
Figure 6B:
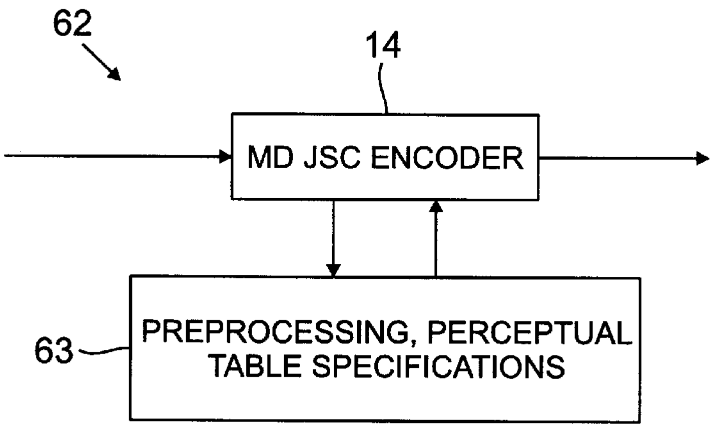
Figure 6C:
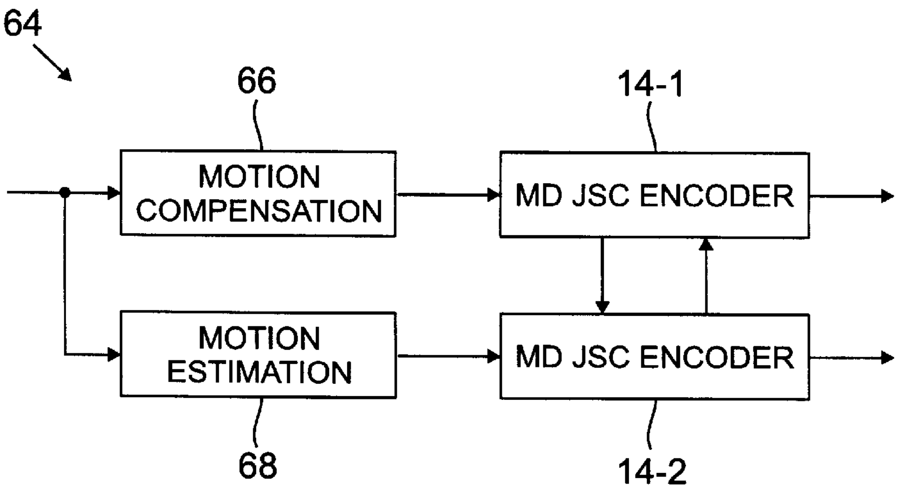

FIGS. 6A through 6C illustrate the manner in which the MD JSC encoder 14 of FIG. 2 can be implemented in a variety of different encoding applications. In each of the embodiments shown in FIGS. 6A through 6C, the MD JSC encoder 14 is used to implement the quantization, transform and entropy coding operations typically associated with the corresponding encoding application. FIG. 6A shows an audio coder 60 which includes an MD JSC encoder 14 configured to receive input from a conventional psychoacoustics processor 61. FIG. 6B shows an image coder 62 which includes an MD JSC encoder 14 configured to interact with an element 63 providing preprocessing functions and perceptual table specifications. FIG. 6C shows a video coder 64 which includes first and second MD JSC encoders 14-1 and 14-2. The first encoder 14-1 receives input from a conventional motion compensation element 66, while the second encoder 14-2 receives input from a conventional motion estimation element 68. The encoders 14-1 and 14-2 are interconnected as shown. It should be noted that these are only examples of applications of an MD JSC encoder in accordance with the invention. It will be apparent to those skilled in the art that numerous alternate configurations may also be used, in audio, image, video and other applications.

A general model for analyzing MDTC techniques in accordance with the invention will now be described. Assume that a source sequence $\{x_k\}$ is input to an MD JSC encoder, which outputs m streams at rates $R_1, R_2, \ldots, R_m$. These streams are transmitted on m separate channels. One version of the model may be viewed as including many receivers, each of which receives a subset of the channels and uses a decoding algorithm based on which channels it receives. More specifically, there may be $2^m-1$ receivers, one for each distinct subset of streams except for the empty set, and each experiences some distortion. An equivalent version of this model includes a single receiver when each channel may have failed or not failed, and the status of the channel is known to the receiver decoder but not to the encoder. Both versions of the model provide reasonable approximations of behavior in a lossy packet network. As previously noted, each channel may correspond to a packet or a set of packets. Some packets may be lost in transmission, but because of header information it is known which packets are lost. An appropriate objective in a system which can be characterized in this manner is to minimize a weighted sum of the distortions subject to a constraint on a total rate R. For m=2, this minimization problem is related to a problem from information theory called the multiple description problem. $D_0$, $D_1$ and $D_2$ denote the distortions when both channels are received, only channel 1 is received, and only channel 2 is received, respectively. The multiple description problem involves determining the achievable $(R_1, R_2, D_0, D_1, D_2)$-tuples. A complete characterization for an independent, identically-distributed (i.i.d.) Gaussian source and squared-error distortion is described in L. Ozarow, "On a source-coding problem with two channels and three receivers," Bell Syst. Tech. J., 59(8):1417–1426, 1980. It should be noted that the solution described in the L. Ozarow reference is non-constructive, as are other achievability results from the information theory literature.

An MDTC coding structure for implementation in the MD JSC encoder 14 of FIG. 2 in accordance with the invention will now be described. In this illustrative embodiment, it will be assumed for simplicity that the source sequence $\{x_k\}$ input to the encoder is an i.i.d. sequence of zero-mean jointly Gaussian vectors with a known correlation matrix $R_x=[x_k x_k^T]$. The vectors can be obtained by blocking a scalar Gaussian source. The distortion will be measured in terms of mean-squared error (MSE). Since the source in this example is jointly Gaussian, it can also be assumed without loss of generality that the components are independent. If the components are not independent, one can use a Karhunen-Loeve transform of the source at the encoder and the inverse at each decoder. This embodiment of the invention utilizes the following steps for implementing MDTC of a given source vector x:

1. The source vector x is quantized using a uniform scalar quantizer with stepsize $\Delta$: $x_{qi}=[x_i]_\Delta$, where $[\cdot]_\Delta$ denotes rounding to the nearest multiple of $\Delta$.

2. The vector $x_q=[x_{q1}, x_{q2}, \ldots x_{qn}]^T$ is transformed with an invertible, discrete transform $\hat{T}$: $\Delta Z^n \rightarrow \Delta Z^n$, $y=\hat{T}(x_q)$. The design and implementation of $\hat{T}$ are described in greater detail below.

3. The components of y are independently entropy coded.

4. If m>n, the components ofy are grouped to be sent over the m channels.

When all of the components of y are received, the reconstruction process is to exactly invert the transform $\hat{T}$ to get $\hat{x}=x_q$. The distortion is the quantization error from Step 1 above. If some components of y are lost, these components are estimated from the received components using the statistical correlation introduced by the transform $\hat{T}$. The estimate $\hat{x}$ is then generated by inverting the transform as before.

Starting with a linear transform T with a determinant of one, the first step in deriving a discrete version $\hat{T}$ is to factor T into "lifting" steps. This means that T is factored into a product of lower and upper triangular matrices with unit diagonals $T=T_1T_2 \ldots T_k$. The discrete version of the transform is then given by:

$$\hat{T}(x_q)=[T_1[T_2 \ldots [T_k x_q]_\Delta]_\Delta]_\Delta. \tag{1}$$

The lifting structure ensures that the inverse of $\hat{T}$ can be implemented by reversing the calculations in (1):

$$\hat{T}^{-1}(y)=[T_k^{-1} \ldots [T_2^{-1}[T_1^{-1}y]_\Delta]_\Delta]_\Delta.$$

The factorization of T is not unique. Different factorizations yield different discrete transforms, except in the limit as A approaches zero. The above-described coding structure is a generalization of a 2×2 structure described in the above-cited M. T. Orchard et al. reference. As previously noted, this reference considered only a subset of the possible 2×2 transforms; namely, those implementable in two lifting steps.

It is important to note that the illustrative embodiment of the invention described above first quantizes and then applies a discrete transform. If one were to instead apply a continuous transform first and then quantize, the use of a nonorthogonal transform could lead to non-cubic partition cells, which are inherently suboptimal among the class of partition cells obtainable with scalar quantization. See, for example, A. Gersho and R. M. Gray, "Vector Quantization and Signal Compression," Kluwer Acad. Pub., Boston, Mass., 1992. The above embodiment permits the use of discrete transforms derived from nonorthogonal linear transforms, resulting in improved performance.

An analysis of an exemplary MDTC system in accordance with the invention will now be described. This analysis is based on a number of fine quantization approximations which are generally valid for small $\Delta$. First, it is assumed that the scalar entropy of $y=\hat{T}([x]_\Delta)$ is the same as that of $[Tx]_\Delta$. Second, it is assumed that the correlation structure of y is unaffected by the quantization. Finally, when at least one component of y is lost, it is assumed that the distortion is dominated by the effect of the erasure, such that quantization can be ignored. The variances of the components of x are denoted by $\sigma_1^2, \sigma_2^2 \ldots \sigma_n^2$ and the correlation matrix of x is denoted by $R_x$, where $R_x=\text{diag}(\sigma_1^2, \sigma_2^2 \ldots \sigma_n^2)$. Let $R_y=TR_xT^T$. In the absence of quantization, $R_y$ would correspond to the correlation matrix of y. Under the above-noted fine quantization approximations, $R_y$ will be used in the estimation of rates and distortions.

The rate can be estimated as follows. Since the quantization is fine, $y_i$ is approximately the same as $[(Tx)_i]_\Delta$, i.e., a uniformly quantized Gaussian random variable. If $y_i$ is treated as a Gaussian random variable with power $\sigma_{yi}^2=(R_y)_{ii}$ quantized with stepsize $\Delta$, the entropy of the quantized coefficient is given by:

$$H(y_i)\approx ½ \log 2\pi e\sigma_{yi}^2-\log \Delta=½ \log \sigma_{yi}^2+½ \log 2\pi e-\log \Delta=½ \log \sigma_{yi}^2+k_\Delta,$$

where $k_\Delta \triangleq (\log 2\pi e)/2-\log \Delta$ and all logarithms are base two. Notice that $k_\Delta$ depends only on $\Delta$. The total rate R can therefore be estimated as:

$$R=\sum_{i=1}^{n} H(y_i)=nk_\Delta+\frac{1}{2}\log\prod_{i=1}^{n}\sigma_{yi}^2. \tag{2}$$

The minimum rate occurs when the product from i=1 to n of $\sigma_{yi}^2$ is equivalent to the product from i=1 to n of $\sigma_i^2$, and at this rate the components of y are uncorrelated. It should be noted that T=I is not the only transform which achieves the minimum rate. In fact, it will be shown below that an arbitrary split of the total rate among the different components of y is possible. This provides a justification for using a total rate constraint in subsequent analysis.

The distortion will now be estimated, considering first the average distortion due only to quantization. Since the quantization noise is approximately uniform, the distortion is $\Delta^2/12$ for each component. Thus the distortion when no components are lost is given by:

$$D_0=\frac{n\Delta^2}{12} \tag{3}$$

and is independent of T.

The case when 1>0 components are lost will now be considered. It first must be determined how the reconstruction will proceed. By renumbering the components if necessary, assume that $y_1, y_2, \ldots y_{n-1}$ are received and $y_{n-1+1}, \ldots y_n$ are lost. First partition y into "received" and "not received" portions as $y=[y_r, y_{nr}]$ where $y_r=[y_1, y_2, \ldots y_{n-1}]^T$ and $y_{nr}=[y_{n-1+1}, \ldots y_n]^T$. The minimum MSE estimate $\hat{x}$ of x given $y_r$ is $E[x|y_r]$ which has a simple closed form because in this example x is a jointly Gaussian vector. Using the linearity of the expectation operator gives the following sequence of calculations:

$$\begin{aligned}\hat{x}&=E[x\mid y_r]=E[T^{-1}Tx\mid y_r]\\&=T^{-1}E[Tx\mid y_r]\\&=T^{-1}E\left[\begin{bmatrix}y_r\\y_{nr}\end{bmatrix}\middle| y_r\right]=T^{-1}\begin{bmatrix}y_r\\E[y_{nr}\mid y_r]\end{bmatrix}.\end{aligned} \tag{4}$$

If the correlation matrix of y is partitioned in a way compatible with the partition of y as: then it can be shown that the conditional signal $y_r|y_{nr}$ is Gaussian with mean $B^TR_1^{-1}$ $y_r$ and $$R_y=TR_xT^T=\begin{bmatrix}R_1 & B\\B^T & R_2\end{bmatrix},$$

correlation matrix $A \triangleq R_2-B^TR_1^{-1}B$. Thus, $E[y_r|y_{nr}]=B^TR_1^{-1}y_r$, and $\eta \triangleq y_{nr}-E[y_{nr}|y_r]$ is Gaussian with zero mean and correlation matrix A. The variable $\eta$ denotes the error in predicting $y_{nr}$ from $y_r$ and hence is the error caused by the erasure. However, because a nonorthogonal transform has been used in this example, $T^{-1}$ is used to return to the original coordinates before computing the distortion. Substituting $y_{nr}-\eta$ in (4) above gives the following expression for $\hat{x}$:

$$T^{-1}\begin{bmatrix}y_r\\y_{nr}-\eta\end{bmatrix}=x+T^{-1}\begin{bmatrix}0\\-\eta\end{bmatrix},$$

such that $\|x-\hat{x}\|$ is given by:

$$\left\|T^{-1}\begin{bmatrix}0\\\eta\end{bmatrix}\right\|^2=\eta^TU^TU\eta,$$

where U is the last l columns of $T^{-1}$. The expected value $E[\|x-\hat{x}\|]$ is then given by:

$$\sum_{i=1}^{l}\sum_{j=1}^{l}(U^TU)_{ij}A_{ij}. \tag{5}$$

The distortion with l erasures is denoted by $D_l$. To determine $D_l$, (5) above is averaged over all possible combinations of erasures of l out of n components, weighted by their probabilities if the probabilities are non-equivalent. An additional distortion criteria is a weighted sum $\overline{D}$ of the distortions incurred with different numbers of channels available, where $\overline{D}$ is given by:

$$\sum_{l=1}^{n}\alpha_l D_l.$$

For a case in which each channel has a failure probability of p and the channel failures are independent, the weighting $$\alpha_l=\binom{n}{l}p^l(1-p)^{n-l}$$

makes the weighted sum $\overline{D}$ the overall expected MSE. Other choices of weighting could be used in alternative embodiments. Consider an image coding example in which an image is split over ten packets. One might want acceptable image quality as long as eight or more packets are received. In this case, one could set $\alpha_3=\alpha_4=\ldots=\alpha_{10}=0$.

The above expressions may be used to determine optimal transforms which minimize the weighted sum $\overline{D}$ for a given rate R. Analytical solutions to this minimization problem are possible in many applications. For example, an analytical solution is possible for the general case in which n=2 components are sent over m=2 channels, where the channel failures have unequal probabilities and may be dependent. Assume that the channel failure probabilities in this general case are as given in the following table.

| | Channel 1 | |
|---|---|---|
| | no failure | failure |
| Channel 2 | | |
| failure | $1-p_0-p_1-p_2$ | $p_1$ |
| no failure | $p_2$ | $p_0$ |

If the transform T is given by:

$$T = \begin{bmatrix} a & b \\ c & d \end{bmatrix},$$

minimizing (2) over transforms with a determinant of one gives a minimum possible rate of:

$$R^* = 2k_\Delta + \log \sigma_1\sigma_2.$$

The difference $\rho = R - R^*$ is referred to as the redundancy, i.e., the price that is paid to reduce the distortion in the presence of erasures. Applying the above expressions for rate and distortion to this example, and assuming that $\sigma_1 > \sigma_2$, it can be shown that the optimal transform will satisfy the following expression:

$$|a| = \frac{\sigma_2}{2c\sigma_1}\left[\sqrt{2^{2\rho}-1} + \sqrt{2^{2\rho}-1-4bc(bc+1)}\,\right].$$

The optimal value of bc is then given by:

$$(bc)_{optimal} = -\frac{1}{2} + \frac{1}{2}\left(\frac{p_1}{p_2}-1\right)\left[\left(\frac{p_1}{p_2}+1\right)^2 - 4\left(\frac{p_1}{p_2}\right)2^{-2\rho}\right]^{-1/2}.$$

The value of $(bc)_{optimal}$ ranges from −1 to 0 as $p_1/p_2$ ranges from 0 to ∞. The limiting behavior can be explained as follows: Suppose $p_1 \gg p_2$, i.e., channel 1 is much more reliable than channel 2. Since $(bc)_{optimal}$ approaches 0, ad must approach 1, and hence one optimally sends $x_1$ (the larger variance component) over channel 1 (the more reliable channel) and vice-versa.

If $p_1 = p_2$ in the above example, then $(bc)_{optimal} = -\frac{1}{2}$, independent of ρ. The optimal set of transforms is then given by: $a \neq 0$ (but otherwise arbitrary), $c = -\frac{1}{2}b$, $d = \frac{1}{2}a$ and $$b = \pm\left(2^\rho - \sqrt{2^{2\rho}-1}\,\right)\sigma_1 a/\sigma_2.$$

Using a transform from this set gives:

$$D_1 = \frac{1}{2}(D_{1,1} + D_{1,2}) = \sigma_1^2 - \frac{1}{2\cdot 2^\rho\left(2^\rho - \sqrt{2^{2\rho}-1}\,\right)}(\sigma_1^2 - \sigma_2^2). \qquad (6)$$

For values of $\sigma_1 = 1$ and $\sigma_2 = 0.5$, $D_1$, as expected, starts at a maximum value of $(\sigma_1^2 + \sigma_2^2)/2$ and asymptotically approaches a minimum value of $\sigma_2^2$. By combining (2), (3) and (6), one can find the relationship between R, $D_0$ and $D_1$. It should be noted that the optimal set of transforms given above for this example provides an "extra" degree of freedom, after fixing ρ, that does not affect the ρ vs. $D_1$ performance. This extra degree of freedom can be used, for example, to control the partitioning of the total rate between the channels, or to simplify the implementation.

Although the conventional 2x2 transforms described in the above-cited M. T. Orchard et al. reference can be shown to fall within the optimal set of transforms described herein when channel failures are independent and equally likely, the conventional transforms fail to provide the above-noted extra degree of freedom, and are therefore unduly limited in terms of design flexibility. Moreover, the conventional transforms in the M. T. Orchard et al. reference do not provide channels with equal rate (or, equivalently, equal power). The extra degree of freedom in the above example can be used to ensure that the channels have equal rate, i.e., that $R_1 = R_2$, by implementing the transform such that $|a| = |c|$ and $|b| = |d|$. This type of rate equalization would generally not be possible using conventional techniques without either rendering the resulting transform suboptimal or introducing additional complexity, e.g., through the use of multiplexing.

As previously noted, the invention may be applied to any number of components and any number of channels. For example, the above-described analysis of rate and distortion may be applied to transmission of n=3 components over m=3 channels. Although it becomes more complicated to obtain a closed form solution, various simplifications can be made in order to obtain a near-optimal solution. If it is assumed in this example that $\sigma_1 > \sigma_2 > \sigma_3$, and that the channel failure probabilities are equal and small, a set of transforms that gives near-optimal performance is given by:

$$\begin{bmatrix} a & -\frac{\sqrt{3}\,\sigma_1 a}{\sigma_2} & -\frac{\sigma_2}{6\sqrt{3}\,\sigma_1^2 a^2} \\ 2a & 0 & \frac{\sigma_2}{6\sqrt{3}\,\sigma_1^2 a^2} \\ a & \frac{\sqrt{3}\,\sigma_1 a}{\sigma_2} & -\frac{\sigma_2}{6\sqrt{3}\,\sigma_1^2 a^2} \end{bmatrix}.$$

Optimal or near-optimal transforms can be generated in a similar manner for any desired number of components and number of channels.

Figure 7:
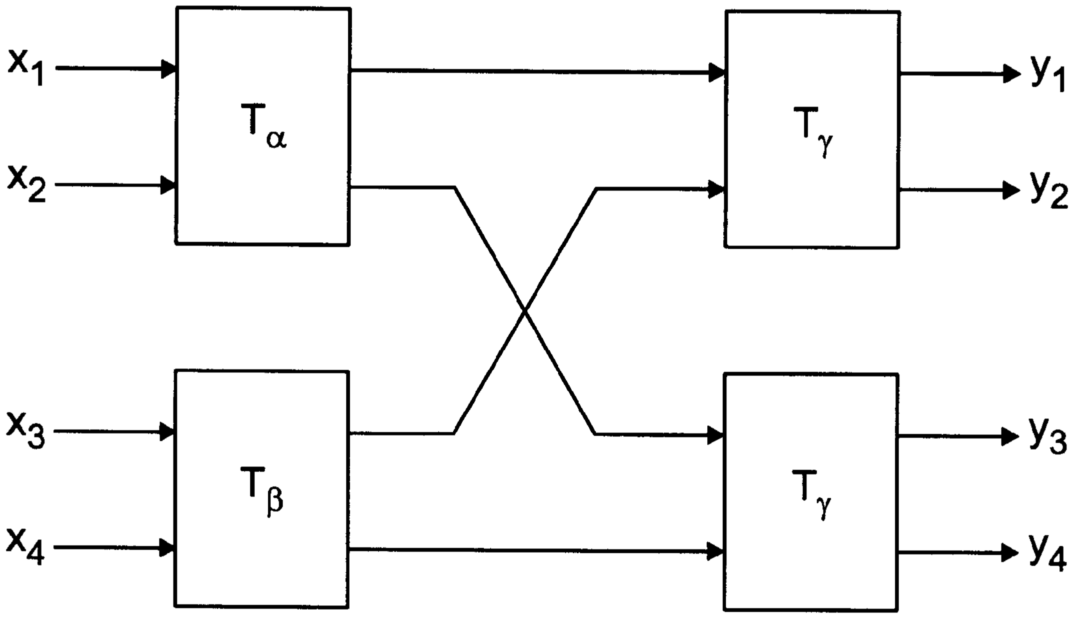
FIG. 7 illustrates an exemplary 4×4 cascade structure which may be used in an MD JSC encoder in accordance with the invention.

FIG. 7 illustrates one possible way in which the MDTC techniques described above can be extended to an arbitrary number of channels, while maintaining reasonable ease of transform design. This 4x4 transform embodiment utilizes a cascade structure of 2x2 transforms, which simplifies the transform design, as well as the encoding and decoding processes (both with and without erasures), when compared to use of a general 4x4 transform. In this embodiment, a 2x2 transform $T_\alpha$ is applied to components $x_1$ and $x_2$, and a 2x2 transform $T_\beta$ is applied to components $x_3$ and $x_4$. The outputs of the transforms $T_\alpha$ and $T_\beta$ are routed to inputs of two 2x2 transforms $T_\gamma$ as shown. The outputs of the two 2x2 transforms $T_\gamma$ correspond to the four channels $y_1$ through $y_4$. This type of cascade structure can provide substantial performance improvements as compared to the simple pairing of coefficients in conventional techniques, which generally cannot be expected to be near optimal for values of m larger than two. Moreover, the failure probabilities of the channels $y_1$ through $y_4$ need not have any particular distribution or relationship. FIGS. 2, 3, 4 and 5A–5D above illustrate more general extensions of the MDTC techniques of the invention to any number of signal components and channels.

Illustrative embodiments of the invention more particularly directed to transmission of audio will be described below with reference to FIGS. 8–12. These embodiments of the invention apply the MDTC techniques described above to perceptual coders. The common goal of perceptual coders is to minimize human-perceived distortion rather than an objective distortion measure such as the signal-to-noise ratio (SNR). Perceptual coders are generally always lossy. Instead of trying to model the source, which may be unduly complex, e.g., for audio signal sources, the perceptual coders instead model the perceptual characteristics of the listener and attempt to remove irrelevant information contained in the input signal. Perceptual coders typically combine both source coding techniques to remove signal redundancy and perceptual coding techniques to remove signal irrelevancy. Typically, a perceptual coder will have a lower SNR than an equivalent-rate lossy source coder, but will provide superior perceived quality to the listener. By the same token, for a given level of perceived quality, the perceptual coder will generally require a lower bit rate.

The perceptual coder used in the embodiments to be described below is assumed to be the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein. The PAC attempts to minimize the bit rate requirements for the storage and/or transmission of digital audio data by the application of sophisticated hearing models and signal processing techniques. In the absence of channel errors, the PAC is able to achieve near stereo compact disk (CD) audio quality at a rate of approximately 128 kbps. At a lower bit rate of 96 kbps, the resulting quality is still fairly close to that of CD audio for many important types of audio material.

PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel). Different portions of a given packet can therefore exhibit varying sensitivity to transmission errors. For example, corrupted control information leads to loss of synchronization and possible propagation of errors. On the other hand, the spectral components contain certain interframe and/or interchannel redundancy which can be exploited in an error mitigation algorithm incorporated in a PAC decoder. Even in the absence of such redundancy, the transmission errors in different audio components have varying perceptual implications. For example, loss of stereo separation is far less annoying to a listener than spectral distortion in the mid-frequency range in the center channel. U.S. patent application Ser. No. 09/022,114, which was filed Feb. 11, 1998 in the name of inventors Deepen Sinha and Carl-Erik W. Sundberg, and which is incorporated by reference herein, discloses techniques for providing unequal error protection (UEP) of a PAC bitstream by classifying the bits in different categories of error sensitivity.

Figure 8:
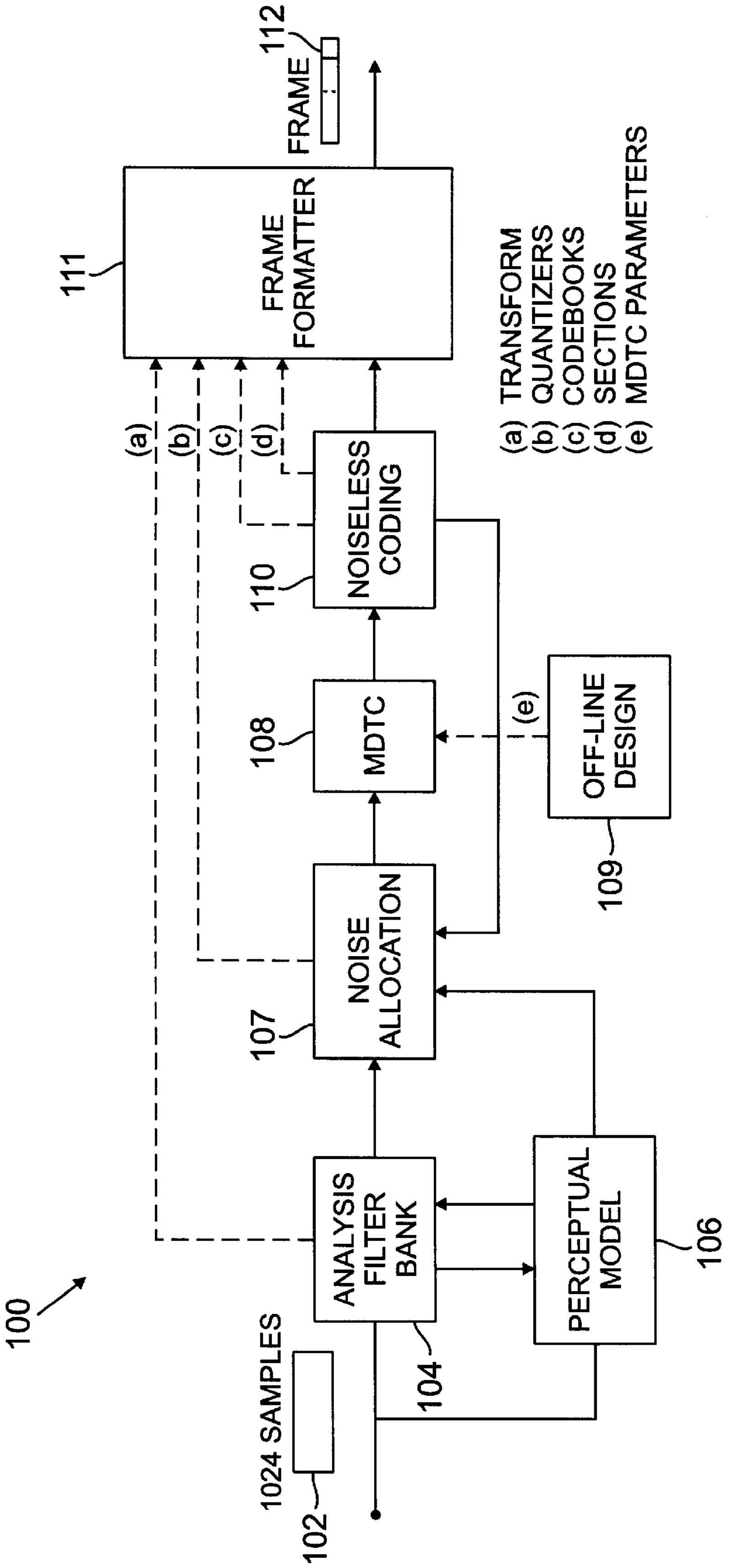
FIG. 8 shows an illustrative embodiment of an MD JSC perceptual audio coder (PAC) encoder in accordance with the invention.

FIG. 8 shows an illustrative embodiment of an MD joint source-channel PAC encoder 100 in accordance with the invention. The MD PAC encoder 100 separates an input audio signal into 1024-sample blocks 102, each corresponding to a single frame. The blocks are applied to an analysis filter bank 104 which converts this time-domain data to the frequency domain. First, a given 1024-sample block 102 is analyzed and, depending on its characteristics, e.g., stationarity and time resolution, a transform, e.g., a modified discrete cosine transform (MDCT) or a wavelet transform, is applied. Factors such as, e.g., the sampling rate and target bit rate for the coded signal, may also be taken into account in the design of this transform. The analysis filter bank 104 in PAC encoder 100 produces either 1024-sample or 128-sample blocks of frequency domain coefficients. In either case, the base unit for further processing is a block of 1024 samples. A perceptual model 106 computes a frequency domain threshold of masking both from the time domain audio signal and from the output of the analysis filter bank 104. The threshold of masking refers generally to the maximum amount of noise that can be added to the audio signal at a given frequency without perceptibly altering it. Depending on the transform used in the analysis filter bank 104, each 1024-sample block is separated into a predefined number of bands, referred to herein as "gain factor bands" or simply "factor bands." Within each factor band, a perceptual threshold value is computed by the perceptual model 106. The frequency domain coefficients from the analysis filter bank 104, and the perceptual threshold values from the perceptual model 106, are supplied as inputs to a noise allocation element 107 which quantizes the coefficients.

In the noise allocation element 107, the computed perceptual threshold values are used, as part of the quantization process, to allocate noise to the frequency domain coefficients from the analysis filter bank 104. Within each of the factor bands, the quantization step sizes are adjusted according to the computed perceptual threshold values in order to meet the noise level requirements. This process of determining quantization step sizes also takes into account a target bit rate for the coded signal, and as a result may involve both overcoding, i.e., adding less noise to the signal than the perceptual threshold requires, and undercoding, i.e., adding more noise than required. The output of noise allocation element 107 is a quantized representation of the original audio signal that satisfies the target bit rate requirement. This quantized representation is applied to a multiple description transform coder (MDTC) 108.

The operation of the MDTC 108 will be described for a two-component, two-channel embodiment, i.e., an n=2×m=2, or 2×2, embodiment, although it should be understood that the described techniques can be extended in a straightforward manner to any desired number of components and channels. The components in the 2×2 embodiment are pairs of quantized coefficients, which may be referred to as $y_1$ and $y_2$, and the two channels will be referred to as Channel 1 and Channel 2. It will be assumed for the 2×2 embodiment to be described below that the MD transform applied in MDTC 108 is a correlating 2×2 equal-rate transform T of the form:

$$T = \begin{bmatrix} a & b \\ c & d \end{bmatrix}.$$

As described above, the equal rate condition may be satisfied by implementing the transform T such that |a|=|c| and |b|=|d|. An example of a transform of this type, which also satisfies the optimality conditions described above, is given by:

$$T_\alpha = \begin{bmatrix} \alpha & 1/(2\alpha) \\ -\alpha & -1/(2\alpha) \end{bmatrix}, \tag{7}$$

with the transform parameter α given by:

$$\alpha = \sqrt{\frac{2^\rho + \sqrt{2^{2\rho} - 1}}{2\sigma_1/\sigma_2}}. \tag{8}$$

When there are no erasures in this embodiment, i.e., when both Channel 1 and Channel 2 are received correctly, the audio signal can be perfectly reconstructed using:

$$T_\alpha^{-1} = \begin{bmatrix} \frac{1}{2\alpha} & -\frac{1}{2\alpha} \\ \alpha & \alpha \end{bmatrix}. \tag{9}$$

Assuming that the second component $y_2$ is lost, a minimum MSE reconstruction of $y_2$ starts with $\hat{y}=[y_1; E[y_2|y_1]$. Then $\hat{x}=T_\alpha^{-1}\hat{y}$. Using $E[y_2|y_1]=(R_y)_{1,2}(R_y)_{1,l}\, y_1$, and after applying $T_\alpha^{-1}$ to the estimate $\hat{y}$, the optimal reconstruction $\hat{x}$ is given by:

$$\frac{2\alpha}{4\alpha^4\sigma_1^2+\sigma_2^2}\begin{bmatrix} 2\alpha^2\sigma_1^2 \\ \sigma_2^2 \end{bmatrix} y_1. \tag{10}$$

Similarly, if the first component $y_2$ is lost, the optimal reconstruction $\hat{x}$ is given by:

$$\frac{2\alpha}{4\alpha^4\sigma_1^2+\sigma_2^2}\begin{bmatrix} -2\alpha^2\sigma_1^2 \\ \sigma_2^2 \end{bmatrix} y_2. \tag{11}$$

In designing the correlating transform $T_\alpha$ defined in (7) above, the transform parameter α for each pair is obtained using (8) in conjunction with the total amount of redundancy to be introduced. Then the optimal redundancy allocation between pairs is determined, as well as the optimal transform parameter α for each pair.

Within each 1024-sample block, or within eight 128-sample blocks contained in each 1024-sample block, MD transform coding is applied on the quantized coefficients from the noise allocation element 107. In the illustrative 2×2 embodiment, the MDTC transform is applied to pairs of quantized coefficients and produces pairs of MD-domain quantized coefficients, using MDTC parameters determined as part of an off-line design process 109. Within each pair, MD-domain quantized coefficients are then assigned to either Channel 1 or Channel 2. For example, the quantized coefficients with the higher variance in each pair may be assigned to Channel 1, while the quantized coefficients with the smaller variance are assigned to Channel 2. The MDTC parameters generated in off-line design process 109 include the manner in which quantized coefficients have to be paired, the parameter α of the inverse transform for each pair, and the variances to be used in the estimation of lost MD-domain quantized coefficients.

The output of the MDTC 108 is applied to a noiseless coding element 110. Element 110 uses Huffinan coding to provide an efficient representation of the quantized and transformed coefficients. A set of optimized codebooks are used, each of the codebooks allowing coding for sets of two or four integers. For efficiency, consecutive factor bands with the same quantization step size are grouped into sections, and the same codebook is used within each section.

The encoder 100 further includes a frame formatter 111 which takes the coded quantized coefficients from the noiseless coding element 110, and combines them into a frame 112 with the control information needed to reconstruct the corresponding 1024-sample block. The output of frame formatter 111 is a sequence of such frames. A given frame 102 contains, along with one 1024-sample block or eight 128-sample blocks, the following control information: (a) an identifier of the transform used in the analysis filter bank 104, (b) quantizers, i.e., quantization step sizes, used in the quantization process implemented in noise allocation element 107; (c) codebooks used in the noiseless coding element 110; and (d) sections used in the noiseless coding element 110. This control information accounts for approximately 15% to 20% of the total bit rate of the coded signal. It should be noted that MDTC parameters (e), such as α and pairing information used in MDTC 108, may also be included as part of the control information and transmitted within a frame, or transmitted apart from the frame in a separate channel, or may be otherwise communicated to a decoder, e.g., as part of the off-line design process 109. Additional details regarding the operation of elements 104, 106, 107, 110 and 111 of the MD PAC encoder 100 can be found in the above-cited D. Sinha et al. reference.

Figure 9:
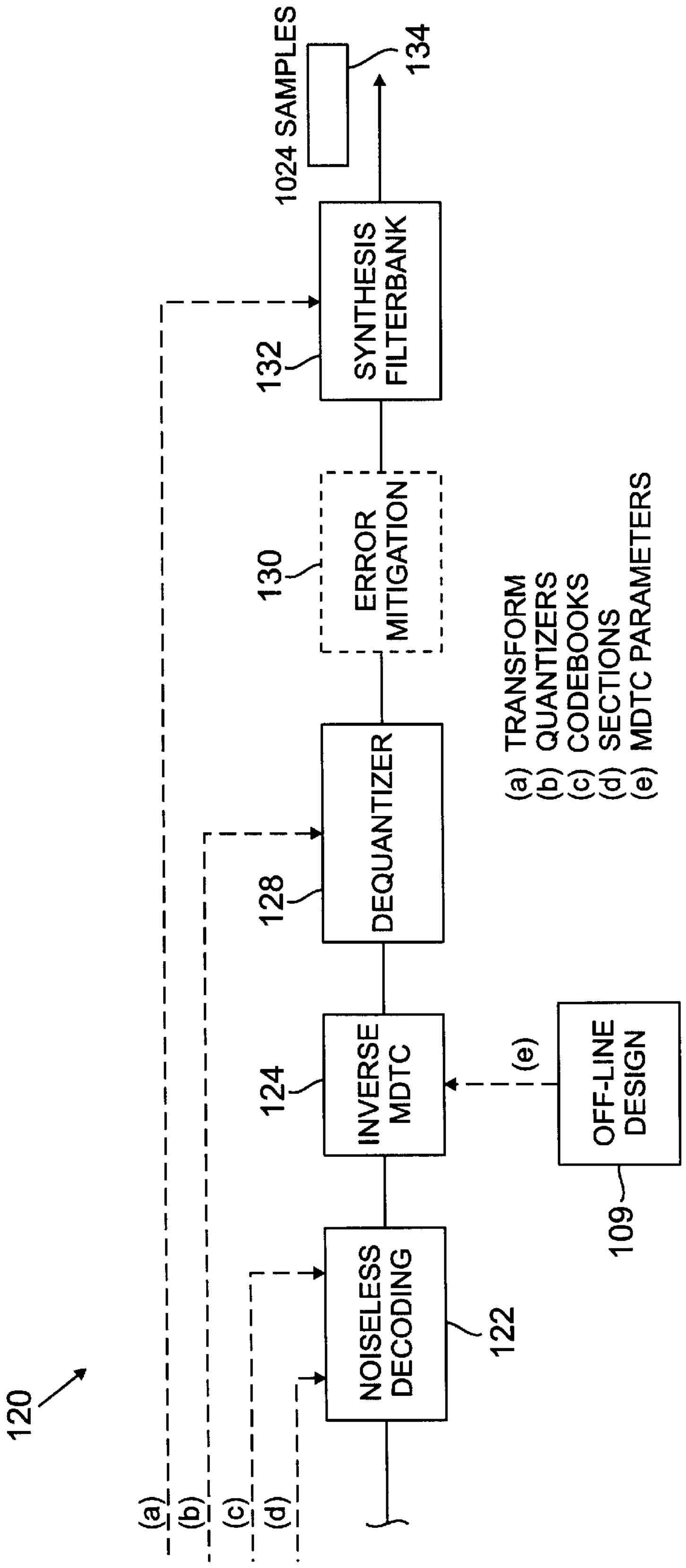
FIG. 9 shows an illustrative embodiment of an MD PAC decoder in accordance with the invention.

FIG. 9 shows an illustrative embodiment of an MD PAC decoder 120 in accordance with the invention. The decoder 120 includes a noiseless decoding element 122, an inverse MDTC 124, a dequantizer 128, an error mitigation element 130, and a synthesis filter bank 132. The decoder 120 generates 1024-sample block 134 from a given received frame. The above-noted control information (a)–(d) is separated from the audio data information and delivered to elements 122, 128 and 132 as shown. The noiseless decoding element 122, dequantizer 128, and synthesis filter bank 132 perform the inverse operations of the noiseless coding element 110, noise allocation element 107 and analysis filter bank 104, respectively. The error mitigation element 130 implements an error recovery technique by interpolating lost frames based on the previous and following frames. The inverse MDTC 124 performs the estimation and recovery of lost MD-domain quantized coefficients. For each 1024-sample block, or eight 128-sample blocks contained in a 1024-sample block, the inverse MDTC function is applied to the MD-domain quantized coefficients from the noiseless decoding element 122. The inverse MDTC 124 in the illustrative 2×2 embodiment applies one of the following inversion strategies:

1. When both Channel 1 and Channel 2 are received, the MD transform is inverted using inverse transform (9) to recover the quantized coefficients perfectly.

2. When Channel 1 is lost, its MD-domain quantized coefficients are estimated from their counterparts in Channel 2 using (10).

3. When Channel 2 is lost, its MD-domain quantized coefficients are estimated from their counterparts in Channel 1 using (11).

4. When both Channel 1 and Channel 2 are lost, the error mitigation feature of the PAC is used.

As in the encoder, MDTC transform parameters from the off-line design process 109 include the manner in which quantized coefficients have to be paired, the parameter α of the inverse transform for each pair, and the variances to be used in the estimation of lost MD-domain quantized coefficients. Once the MDTC has been inverted in accordance with one of the above four strategies, the output quantized coefficients are simply passed to the dequantizer 128.

Various aspects of the encoding process implemented in MD PAC encoder 100 of FIG. 8 will now be described in greater detail. When applying MDTC, a knowledge of the second order statistics, e.g., the variance distribution, of the source is generally needed for designing the optimal pairing and transform, and for the estimation of lost coefficients. The variance distribution of the source can be estimated by, e.g., analyzing the frequency domain coefficients at the output of the analysis filter bank 104 for a particular input audio signal or set of audio signals. As part of this process, a target bit rate may be selected for the coded signal. The target bit rate is generally related to the bandwidth of the source to be coded, and thus to the variance distribution of the source.

Figure 10A:
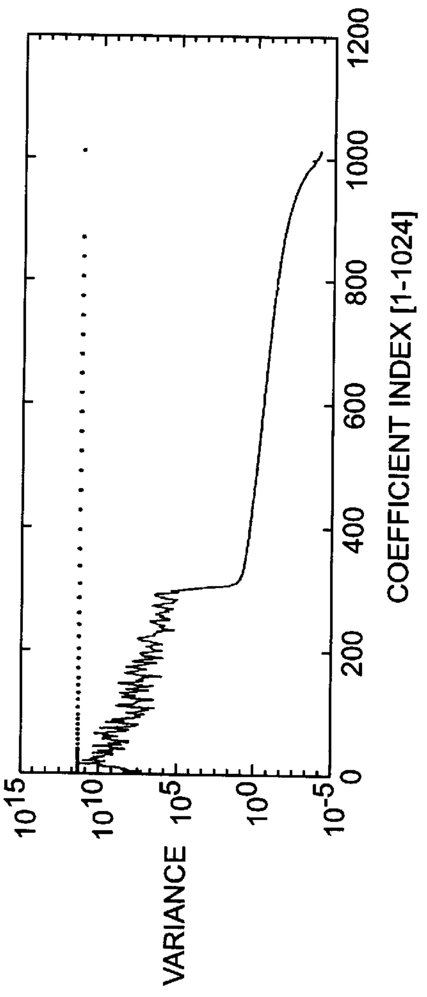
FIGS. 10A and 10B illustrate a variance distribution and a pairing design, respectively, for an exemplary set of audio data, wherein the pairing design requires that coefficients of any given pair must be selected from the same factor band.

For example, for Internet audio applications, a target bit rate of 20 kbps may be selected, although other target bit rates could also be used. FIG. 10A shows an estimated variance distribution as a function of coefficient index for an exemplary audio signal to be coded at a target bit rate of 20 kbps.

After the second order statistics have been estimated or otherwise obtained, a suitable pairing design is determined. For example, in an embodiment in which there are m components, e.g., quantized frequency domain coefficients, to be sent over two channels, a possible optimal pairing may consist of pairing the component having the highest variance with the component having the lowest variance, the second highest variance component with the second lowest variance component, and so on. In one possible pairing approach, the factor bands dividing the 1024-sample or 128-sample blocks are not taken into account, i.e., in this approach it is permissible to pair variables from different factor bands. Since there are 1024 or 128 components to be paired in this case, there will be either 512 or 64 pairs. Since factor bands may have different quantization steps, this approach implies a rescaling of the domain spanned by the components, prior to the application of MDTC, by multiplying components by their respective quantization steps.

Figure 10B:
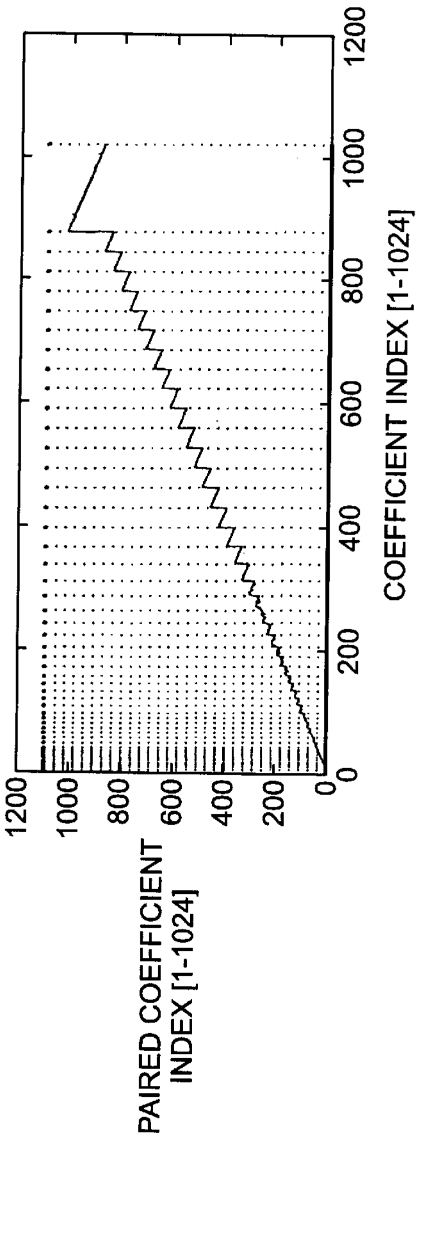

Another possible pairing approach in accordance with the invention takes the factor bands into account, by restricting the pairing of components to those belonging to the same factor band. In this case, there are m components to be paired into m/2 pairs within each factor band. FIG. 10B shows an exemplary pairing design for the audio signal having the estimated variance distribution shown in FIG. 10A, with the pairing restricted by factor band. The vertical dotted lines denote the boundaries of the factor bands. The horizontal axis in FIG. 10B denotes the coefficient index, and the vertical axis indicates the index of the corresponding paired coefficient.

Figure 11:
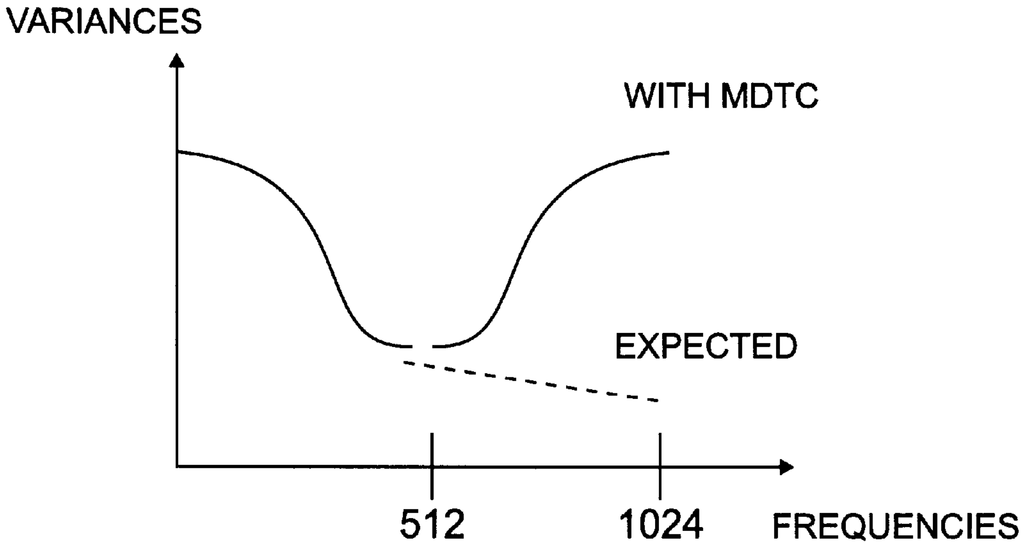
FIGS. 11 and 12 illustrate variance distributions for a pairing design which is unrestricted as to factor bands, and a pairing design in which pairs must be from the same factor band, respectively, in accordance with the invention.
Figure 12:
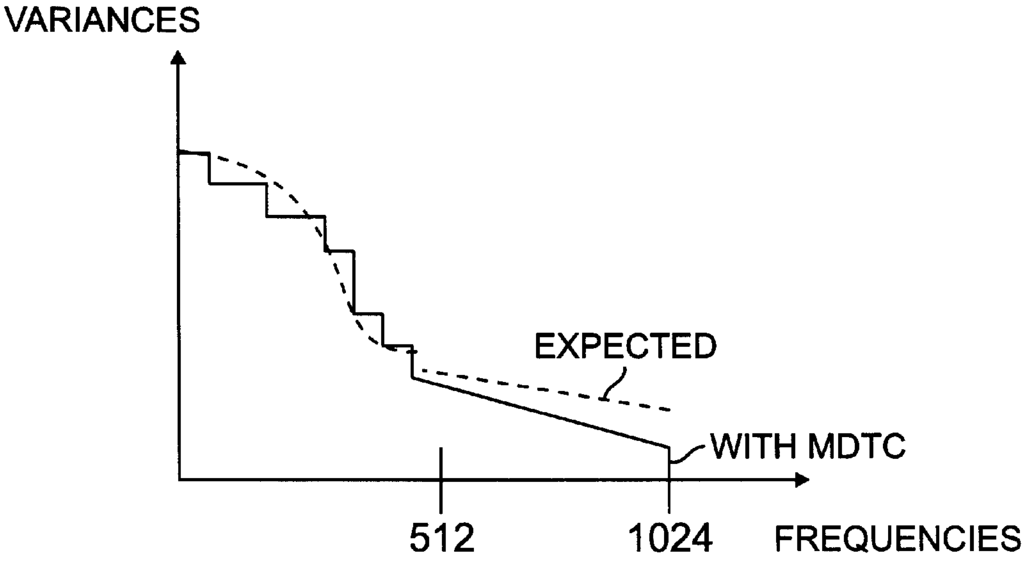

FIGS. 11 and 12 illustrate modifications in the variance distribution resulting from the two different exemplary pairing designs described above, i.e., a pairing which is made without a restriction regarding factor bands and a pairing in which the components in a given pair are each required to occupy the same factor band, respectively. FIG. 11 shows the variance as a function of frequency at the output of the MDTC 108 for a pairing without restriction regarding the factor bands. The solid line represents the variance of the MD-domain outputs of MDTC 108 when pairs are made without restriction regarding the factor bands. The dashed line represents the variance expected by the noiseless coding element 110 of the PAC encoder. In this case, the MDTC has been designed to produce two equal-rate channels, which as shown in FIG. 11 tends to introduce non-zero values in the high frequency portion of the variance distribution. This can lead to inefficient coding and a corresponding quality degradation in that the noiseless coding element 110 of a PAC encoder generally expects zero values in this portion of the variance plot. This problem can be addressed by, e.g., replacing the conventional noiseless coding element 110 with an alternative entropy coder which is optimized for use with the MD-quantized coefficients. Another potential problem with this unrestricted pairing approach is that coefficients from a given pair can be quantized with different step sizes.

FIG. 12 shows that the restricted pairing approach, in which the components of each pair must be in the same factor band, produces variances which much more closely track the variances expected by the noiseless coding element 110 of the PAC encoder. As a result, this restricted pairing approach tends to produce more efficient coding, and therefore better quality reproduction, in an embodiment which utilizes an otherwise conventional PAC noiseless coding process. The restricted pairing approach may be used in conjunction with adjustments to the transform parameter $\alpha$ to ensure that the output of the MDTC 108 is in a format which the entropy coder, e.g., noiseless coding element 110, expects. In addition, this approach avoids any problems which may be associated with having different coefficients of a given pair quantized with different step sizes. Once the pairing has been determined, a suitable correlating transform is designed using the techniques described previously.

As described in conjunction with FIG. 8 above, the output of the MDTC 108, i.e., two channels of MD-domain quantized coefficients in the illustrative 2×2 embodiment, is applied to the noiseless coding element 110. It should be noted that in this embodiment, each channel is not separately entropy coded in element 110. This is motivated by the fact that separate coding of the channels may result in a slight loss in coding gain, since the noiseless coding process basically assigns a codebook to a factor band and then a codeword to a quantized coefficient using precomputed and optimized Huffman coding tables.

The above-described MDTC process, in the 2×2 embodiment, generates two distinct channels which can be sent separately through a network or other communication medium. From a given 1024-sample or 128-sample block, the MDTC produces two sets of 512 or 64 coefficients, respectively. As described previously, the set of coefficients with the higher variances may be considered as Channel 1, and the other set as Channel 2. Since these two channels are generally sent separately, the control information associated with the original block should be duplicated in each channel, which will increase the total bit rate of the coded audio output. As previously noted, the MDTC parameters also represent control information which needs to be transmitted with the coded audio. This information could be transmitted at the beginning of a transmission or specified portion thereof, since it is of relatively small size, e.g., a few tens of kilobytes, relative to the coded audio. Alternatively, as described above, it could be transmitted with the other control information within the frames.

In accordance with the invention, adjustments may be made to the transform parameter $\alpha$, or other characteristics of the MD transform, in order to produce improved performance. For example, simulations have indicated that high-frequency artifacts can be removed from a reconstructed audio signal by adjusting the value of a for the corresponding factor band. This type of high-frequency artifact may be attributable to overvaluation of coefficients within a factor band in which one or more variances drop to very low levels. The overvaluation results from a large difference between variances within the factor band, leading to a very small transform parameter $\alpha$. This problem may be addressed by, e.g., setting the transform parameter $\alpha$ in such a factor band to the value of a from an adjacent factor band, e.g., a previous factor band or a subsequent factor band. Simulations have indicated that such an approach produces improved performance relative to an alternative approach such as setting the transform parameter $\alpha$ to zero within the factor band, which although it removes the corresponding high-frequency artifact, it also results in significant performance degradation.

Alternative embodiments of the invention can use other techniques for estimating $\alpha$ for a given factor band having large variance differences. For example, an average of the $\alpha$ values for a designated number of the previous and/or subsequent factor bands may be used to determine $\alpha$ for the given factor band. Many other alternatives are also possible. For example, the transform parameter α for one or more factor bands may be adjusted based on the characteristics of a particular type of audio signal, e.g., a type of music. Different predetermined transform parameters may be assigned to specific factor bands for a given type of audio signal, and those transform parameters applied once the type of audio signal is identified. As described in conjunction with FIGS. 11 and 12 above, these and other adjustments may be made to ensure that the output of the MDTC 108 is in a format which the subsequent entropy coder expects.

In accordance with another aspect of the invention, the quantized coefficients can be rescaled to equalize for the effect of quantization on the variance. In the analysis given previously, the above-noted fine quantization approximation was used as the basis for an assumption that the quantized and unquantized components of the audio signal had substantially the same variances. However, the quantization process of the PAC encoder generally does not satisfy this approximation due to its use of perceptual coding and coarse quantization. In accordance with the invention, the variances of the quantized components can be rescaled using a factor which is a function of the quantization step size. One such factor which has been determined to be effective with the PAC encoder 100 is $1/\Delta^2$, although other factors could also be used. Other techniques could also be used to further improve the performance of the PAC encoder, such as, e.g., estimating the variances on smaller portions of a set of audio samples, such that the variances more accurately represent the actual signal.

The above-described embodiments of the invention are intended to be illustrative only. For example, although the embodiments of FIGS. 8 and 9 incorporate elements of a conventional PAC encoder, the invention is more generally applicable to digital audio information in any form and generated by any type of audio compression technique. Alternative embodiments of the invention may utilize other coding structures and arrangements. Moreover, the invention may be used for a wide variety of different types of compressed and uncompressed signals, and in numerous coding applications other than those described herein. These and numerous other alternative embodiments within the scope of the following claims will be apparent to those skilled in the art.

What is claimed is:

1. A method of processing an audio signal for transmission, comprising the steps of:

encoding a plurality of components of the audio signal in a multiple description encoder for transmission over a plurality of channels, the multiple description encoder having associated therewith a multiple description transform element which is applied to the plurality of components to generate therefrom a plurality of descriptions of the audio signal, each of the descriptions being transmittable over a given one of the channels, wherein a subset of the descriptions including at least one of the descriptions and fewer than all of the descriptions comprises information characterizing substantially a complete frequency spectrum of the audio signal; and selecting at least one transform parameter for the multiple description transform element of the encoder, based at least in part on a characteristic of the audio signal.

2. The method of claim 1 wherein the components of the audio signal correspond to quantized coefficients of a representation of the audio signal.

3. The method of claim 1 wherein the selecting step includes selecting the transform parameter such that resulting transformed coefficients have a variance distribution of a type expected by a subsequent entropy coding operation.

4. The method of claim 1 wherein the components are quantized coefficients separated into a plurality of factor bands, and the selecting step includes setting a transform parameter in a given factor band to a value determined at least in part based on a transform parameter from at least one other factor band.

5. The method of claim 4 wherein the selecting step includes setting a transform parameter in a given factor band to a value of the transform parameter in an adjacent factor band.

6. The method of claim 1 wherein the components are quantized coefficients separated into a plurality of factor bands, and the selecting step includes adjusting the transform parameter for one or more of the factor bands based on a determination as to whether the audio signal to be encoded is of a particular predetermined type.

7. The method of claim 6 wherein the selecting step further includes the step of selecting a set of predetermined transform parameters for the factor bands based at least in part on a determination as to whether the audio signal to be encoded is of a particular predetermined type.

8. The method of claim 1 wherein the components are quantized coefficients separated into a plurality of factor bands, and the encoding step includes grouping the coefficients for transmission over a given one of the channels such that each coefficient in a given group is in the same factor band.

9. The method of claim 1 wherein the components are quantized coefficients separated into a plurality of factor bands, and the encoding step includes grouping the coefficients for transmission over a given one of the channels without restriction as to which of the factor bands the coefficients are in.

10. The method of claim 1 wherein the components are quantized coefficients separated into a plurality of factor bands, and further including the step of resealing the quantized coefficients for at least one of the factor bands to equalize for the effect of quantization on the transform parameter associated with the factor band.

11. The method of claim 10 wherein the rescaling step includes rescaling the quantized coefficients for a given factor band, using a factor which is a function of the quantization step size used in that factor band.

12. The method of claim 11 wherein the rescaling factor used for the given factor band is approximately $1/\Delta^2$, where $\Delta$ is the quantization step size used in the given factor band.

13. The method of claim 1 wherein the encoding step includes encoding n components of the audio signal for transmission over m channels using a multiple description transform which is in the form of a cascade structure of a plurality of multiple description transforms each having dimension less than n×m.

14. An apparatus for encoding an audio signal for transmission, comprising:

a multiple description encoder for encoding a plurality of components of the audio signal for transmission over a plurality of channels, wherein the encoder selects at least one transform parameter for a multiple description transform element based at least in part on a characteristic of the audio signal, wherein the multiple description transform element is applied to the plurality of components to generate therefrom a plurality of descriptions of the audio signal, each of the descriptions being transmittable over a given one of the channels, and wherein a subset of the descriptions including at least one of the descriptions and fewer than all of the descriptions comprises information characterizing substantially a complete frequency spectrum of the audio signal.

15. The apparatus of claim 14 wherein the components of the audio signal correspond to quantized coefficients of a representation of the audio signal.

16. The apparatus of claim 14 wherein the encoder is further operative to select the transform parameter such that resulting transformed coefficients have a variance distribution of a type expected by a subsequent entropy coding operation.

17. The apparatus of claim 14 wherein the components are quantized coefficients separated into a plurality of factor bands, and the encoder is further operative to set a transform parameter in a given factor band to a value determined at least in part based on a transform parameter from at least one other factor band.

18. The apparatus of claim 17 wherein the encoder is further operative to set a transform parameter in a given factor band to a value of the transform parameter in an adjacent factor band.

19. The apparatus of claim 14 wherein the components are quantized coefficients separated into a plurality of factor bands, and the encoder is further operative to adjust the transform parameter for one or more of the factor bands based on a determination as to whether the audio signal to be encoded is of a particular predetermined type.

20. The apparatus of claim 19 wherein the encoder is further operative to select a set of predetermined transform parameters for the factor bands based at least in part on a determination as to whether the audio signal to be encoded is of a particular predetermined type.

21. The apparatus of claim 14 wherein the components are quantized coefficients separated into a plurality of factor bands, and the encoder is further operative to group the coefficients for transmission over a given one of the channels such that each coefficient in a given group is in the same factor band.

22. The apparatus of claim 14 wherein the components are quantized coefficients separated into a plurality of factor bands, and the encoder is further operative to group the coefficients for transmission over a given one of the channels without restriction as to which of the factor bands the coefficients are in.

23. The apparatus of claim 14 wherein the components are quantized coefficients separated into a plurality of factor bands, and the encoder is further operative to rescale the quantized coefficients for at least one of the factor bands to equalize for the effect of quantization on the transform parameter associated with the factor band.

24. The apparatus of claim 14 wherein the encoder is further operative to rescale the quantized coefficients for a given factor band, using a factor which is a function of the quantization step size used in that factor band.

25. The apparatus of claim 24 wherein the rescaling factor used for the given factor band is approximately $1/\Delta^2$, where $\Delta$ is the quantization step size used in the given factor band.

26. The apparatus of claim 14 wherein the multiple description joint source-channel encoder is operative to encode n components of the signal for transmission over m channels using a multiple description transform which is in the form of a cascade structure of a plurality of multiple description transforms each having dimension less than n×m.

27. The apparatus of claim 14 wherein the multiple description joint source-channel encoder further includes a series combination of N multiple description encoders followed by an entropy coder, wherein each of the N multiple description encoders includes a parallel arrangement of M multiple description encoders.

28. The apparatus of claim 27 wherein each of the M multiple description encoders implements one of: (i) a quantizer block followed by a transform block, (ii) a transform block followed by a quantizer block, (iii) a quantizer block with no transform block, and (iv) an identity function.

29. An apparatus for encoding an audio signal for transmission, comprising:

a multiple description encoder for encoding a plurality of components of the audio signal for transmission over a plurality of channels, wherein the encoder selects at least one transform parameter for a multiple description transform based at least in part on a characteristic of the audio signal, wherein the multiple description encoder is operative to encode n components of the signal for transmission over m channels using the multiple description transform, the multiple description transform being in the form of a cascade structure of a plurality of multiple description transforms each having dimension less than n×m.

30. An apparatus for encoding an audio signal for transmission, comprising:

a multiple description encoder for encoding a plurality of components of the audio signal for transmission over a plurality of channels, wherein the encoder selects at least one transform parameter for a multiple description transform based at least in part on a characteristic of the audio signal, wherein the multiple description encoder further includes a series combination of N multiple description encoders followed by an entropy coder, wherein each of the N multiple description encoders includes a parallel arrangement of M multiple description encoders.

* * * * *